US012268973B2

(12) United States Patent
Warne (10) Patent No.: US 12,268,973 B2
(45) Date of Patent: Apr. 8, 2025

(54) MOTION GENERATOR (71) Applicant: DYNISMA LTD., Bristol (GB)

(72) Inventor: Ashley William Hawker Warne, Bristol (GB)

(73) Assignee: DYNISMA LTD., Bristol (GB)

( * ) Notice: Subject to any disclaimer, the term of this patent is extended or adjusted under 35 U.S.C. 154(b) by 331 days.

(21) Appl. No.: 17/756,848

(22) PCT Filed: Jan. 6, 2021

(86) PCT No.: PCT/EP2021/025000
§ 371 (c)(1),
(2) Date: Jun. 3, 2022

(87) PCT Pub. No.: WO2021/140058
PCT Pub. Date: Jul. 15, 2021

(65) Prior Publication Data
US 2023/0001313 A1 Jan. 5, 2023

(30) Foreign Application Priority Data
Jan. 8, 2020 (GB) ...................................... 2000251

(51) Int. Cl.
*A63G 31/02* (2006.01)
*A63G 31/16* (2006.01)
*G09B 9/12* (2006.01)

(52) U.S. Cl.
CPC ............. *A63G 31/02* (2013.01); *A63G 31/16* (2013.01); *G09B 9/12* (2013.01)

(58) Field of Classification Search
CPC ........ A63G 31/00; A63G 31/02; A63G 31/14; A63G 31/16; A63G 7/00; A63G 25/00
(Continued)

(56) References Cited

U.S. PATENT DOCUMENTS 4,461,470 A * 7/1984 Astroth ................... A63F 13/28
434/57
5,558,582 A * 9/1996 Swensen ................ A63G 31/16
472/43
(Continued)

FOREIGN PATENT DOCUMENTS

EP 3591641 A1 1/2020
JP 2001005372 A 1/2001
WO WO-2020/007506 A1 1/2020

OTHER PUBLICATIONS

International Search Report and Written Opinion for International Application No. PCT/EP2021/025000, dated Mar. 24, 2021, (10 pages), European Patent Office, Rijswijk, Netherlands.
(Continued)

Primary Examiner — Kien T Nguyen
(74) Attorney, Agent, or Firm — Alston & Bird LLP (57) ABSTRACT The invention relates to a motion generator comprising an end effector which moves relative to a surface, the end effector being moved by at least six actuation mechanisms, in which each actuation mechanism comprises an elongate tensioned member connected at one of its ends to the end effector, whereby the end effector is suspended above the surface by the tensioned members, and at the other of its ends to an associated rocker of the same actuation mechanism, whereby the rocker is mounted to be pivotable about an axis which is fixed relative to the surface, and in which, when a rocker is actuated, the associated tensioned member and the end effector are moved. The invention also relates to motion systems and simulators comprising such motion generators, as well as to methods of operation and production.

22 Claims, 12 Drawing Sheets (58) Field of Classification Search
USPC .............................................. 472/59–61, 130
See application file for complete search history.

(56) References Cited

U.S. PATENT DOCUMENTS

| | | | |
|---|---|---|---|
| 6,406,299 B1 | 6/2002 | Murao et al. | |
| 2014/0157916 A1 | 6/2014 | Vatcher et al. | |
| 2016/0001443 A1* | 1/2016 | Davis .................... | A63G 31/16 74/490.08 |
| 2017/0053548 A1 | 2/2017 | Warne | |
| 2017/0282086 A1* | 10/2017 | Logan .................... | A47D 9/016 |

OTHER PUBLICATIONS

Informal Comments by Applicant on the Written Opinion for International Application No. PCT/EP2021/025000, dated May 22, 2021, (2 pages).

* cited by examiner

MOTION GENERATOR

CROSS REFERENCE TO RELATED APPLICATIONS

This application is a National Stage Application, filed under 35 U.S.C. § 371, of International Application No. PCT/EP2021/025000, filed Jan. 6, 2021, which international application claims priority to and the benefit of Great Britain Application No. 2000251.5, filed Jan. 8, 2020; the contents of both of which are hereby incorporated by reference in their entireties.

BACKGROUND

Related Field

This invention relates to the field of motion systems. In particular, though not exclusively, the invention relates to motion generators, and to motion systems including such motion generators, and to methods of using motion generators and motion systems.

Description of Related Art

A motion generator is a device capable of applying forces and/or moments, movements and accelerations to a payload in one or more directions of degrees of freedom. The payload can be, for example, a human undergoing a simulated experience in a motion simulator based on a motion generator. Motion generators are used in motion systems, which include a control system.

Motion systems are used in a variety of applications, including motion simulation (for example, flight simulators, and driving simulators), robotics, 3D printing, vibration, and seismic simulation. The most common type of motion system currently used in motion simulation is the Stewart platform (or "hexapod"). This is a type of parallel robot that has six actuators (typically hydraulic rams), attached in pairs to three configurations on the baseplate of a platform and crossing over to three mounting points on a top plate. Devices or payloads such as a human user placed on the top plate, usually in some form of cockpit, driver area or model vehicle, can be moved in the six degrees of freedom in which it is possible for a freely-suspended body to move, i.e., the three linear movements x, y, z (lateral, longitudinal and vertical), and the three rotations (pitch, roll and yaw).

A motion simulator is a mechanism including a motion system that can create, for an occupant, the effects or feelings of being in a moving vehicle. Motion simulators are used, professionally, for training drivers and pilots in the form of driving simulators and flight simulators respectively. They also are used, industrially, in the creation, design, and testing of the vehicles themselves. Professional motion simulators used for driving and flying simulators typically synchronise a visual display—provided, for example, by a projection system and associated screens and audio signals with the movement of a carriage (or chassis) occupied by the driver or pilot in order to provide a better sensation of the effect of moving. Motion simulators are also used in leisure or gaming applications (for example in an arcade video driving game) The advent of virtual reality (VR) head-mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience.

The type of hexapods typically used for motion simulation for human participants typically have a relatively low bandwidth of up to about 20 Hz. This means that they can create oscillatory movements and vibrations of a consistent amplitude, with a frequency of up to 20 times per second, beyond which the amplitude of the movements reduces as the frequency increases. This is sufficient for replicating most car suspension movements, but it does not transmit the frequency content associated with vibrations from the car engine, tyre vibrations, road noise, and the sharp-edged kerbs on racetracks. A low bandwidth also means the signals are delayed, meaning that the driver cannot respond as quickly.

Current motion systems, especially those intended for high-end use such as in military and commercial flight instruction and training applications, are typically very large, heavy, complex, and very expensive. Their complexity necessitates extensive programming and maintenance, further extending the cost to users. Dedicated driving simulator motion systems have been developed by the likes of McLaren/MTS Williams/ABD and Ansible, but these tend to be extremely mechanically complex, and therefore also very expensive, featuring precision machined custom components and often expensive linear motors. These dedicated driving simulator motion systems are more responsive than hexapods when moving in some directions but are still limited in others. The use of ball screws in such systems is disadvantageous in that, whilst good at establishing position, they inhibit force transfer and can only achieve a lower bandwidth. This results in a less natural experience for a human user.

The applicant's earlier patent publications WO2020/007506 and EP3591641, form part of the technological background to the present invention.

An object of the present invention is to provide an improved motion generator, and improved motion systems and simulators incorporating such motion generators. One object of the invention is to provide a motion generator capable of operation to move the end effector in six degrees of freedom, that is less expensive to produce. Another object of the invention is to provide a motion generator that is suitable for leisure or gaming applications.

BRIEF SUMMARY

According to one aspect of the invention there is provided a motion generator according to claim 1. An advantage of such a motion generator may be that it is less expensive to produce. A further advantage of such a motion generator may be that it is suitable for leisure or gaming applications, for example, because it is relatively simple to produce, or it is particularly compact. A motion generator in accordance with the invention may still have a relatively high bandwidth. The motion generator may be back-driveable.

Further features of a motion generator in accordance with the invention are apparent from certain of the dependent claims included herein, taken alone or in combination.

According to another aspect of the invention there is provided a motion system, the motion system comprising a motion generator according to the invention and a control system.

Another aspect of the invention provides a simulator comprising a motion generator according to the invention or a motion system according to the invention and an environment simulation means.

A further aspect of the invention provides gaming or leisure use motion simulator comprising a motion generator according to the invention, Preferably the motion generator includes an end effector weighing less than 200 kg, less than 100 kg or less than 50 kg, as may be typical in gamin applications, and a motion generator control system.

The invention also provides methods of using a motion generator or motion system as set out, for example, in the second of the independent claims included herein.

The invention also provides a method of producing a motion generator or a motion system according to the third of the independent claims included herein.

BRIEF DESCRIPTION OF THE FIGURES

Motion generators, motion systems, and driving simulators and their operation and production in accordance with the invention will now be described, by way of example only, with reference to the accompanying drawings, FIGS. 1 to 11, in which.

DETAILED DESCRIPTION OF VARIOUS EMBODIMENTS

Motion Generator

Figure 1:
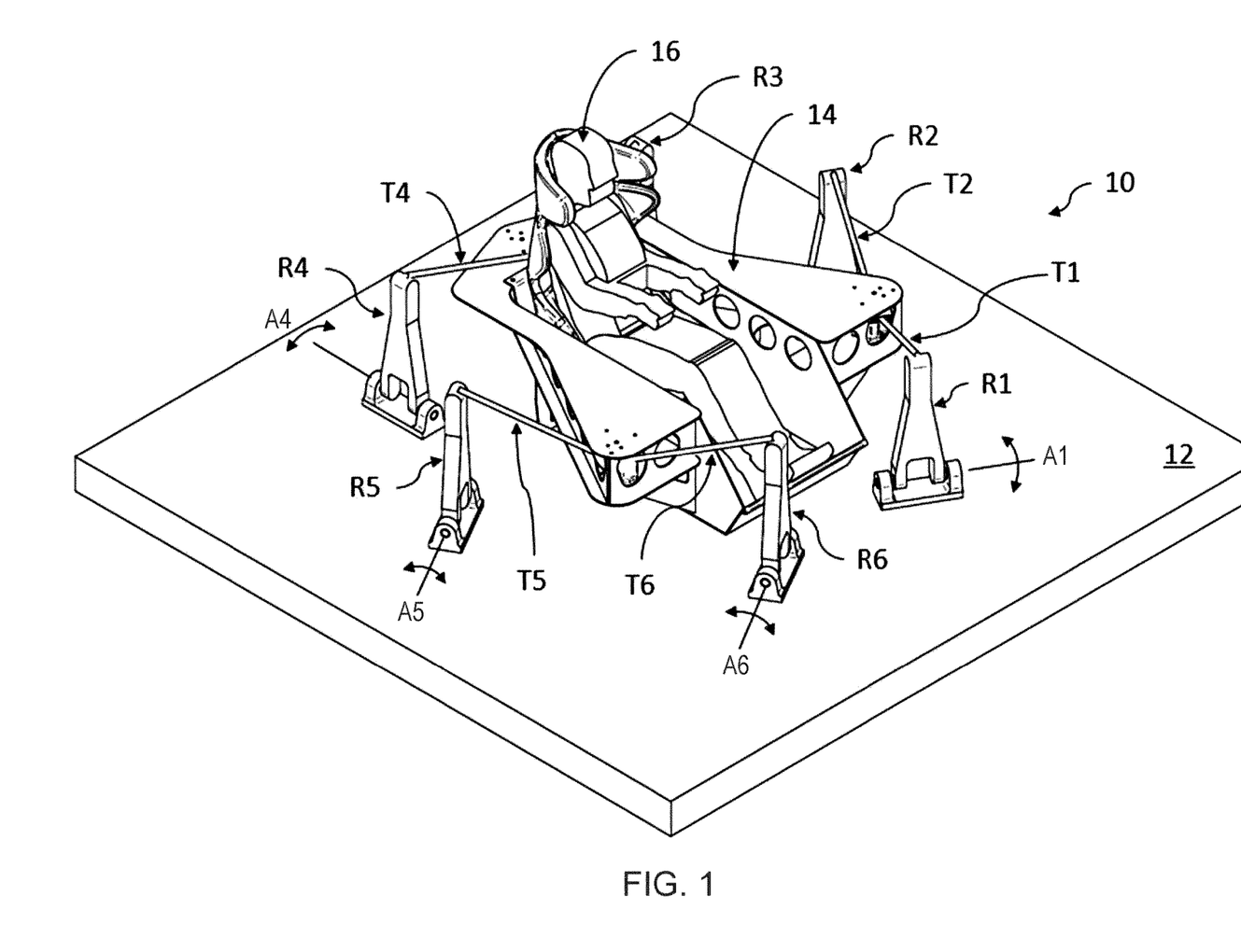
FIG. 1 is a perspective view from the front and one side of a motion generator in accordance with the invention in a neutral condition.

A motion generator 10 in accordance with the invention is shown in FIG. 1. The motion generator 10 is mounted on a surface 12, for example a floor of a building in which the motion generator is located.

Figure 1A:
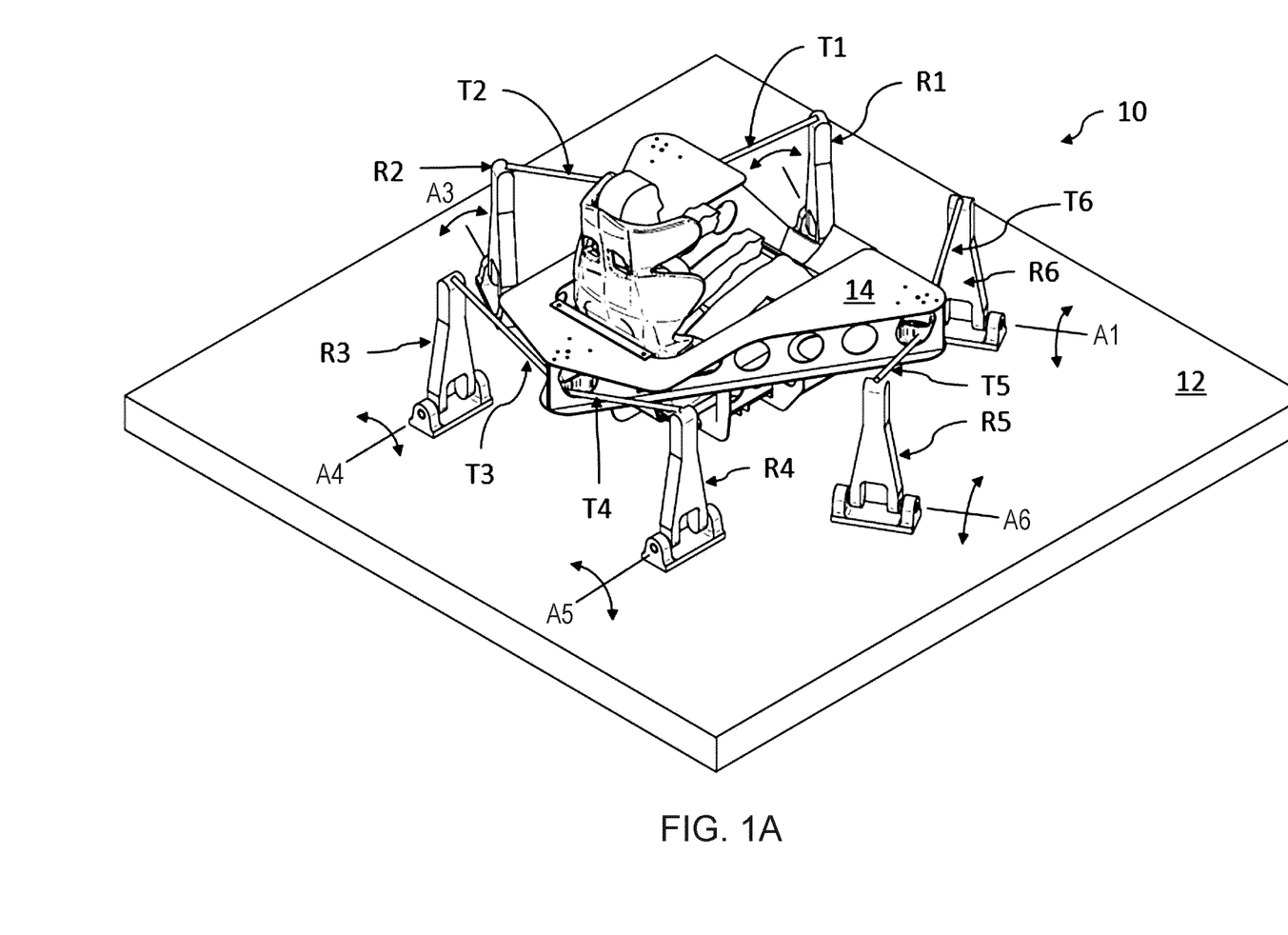
FIG. 1A is a perspective view from the rear and one side of the motion generator of FIG. 1.

The motion generator 10 comprises an end effector in the form of a platform 14 for supporting a payload, here a user 16. The platform 14 is here a replica of racing car cockpit suitable for example for a gaming or leisure application. The platform 14 is suspended from six elongate tensioned members T1-6 included in six actuation mechanisms (not shown completely). One end of each of the elongate tensioned members T1-6 in an actuation mechanism, connects to the platform 14, the other end connects to an end of an associated rocker R1-6, respectively in the actuation mechanism. As shown in FIG. 1A, the rockers R1-6 are pivotally mounted on surface 12 and are free to pivot, or rock, in an anti-clockwise or clockwise direction as indicated by the curved arrows about an axis A indicated by a straight line A1, A2, A3, A4, A5 or A6 under the control of an actuator (which is typically a motor (not shown)). Examples of actuators and complete actuation mechanisms are described in detail below. In the embodiment shown, the rockers R1-6 are mounted on the surface 12. It will be appreciated that those rockers could be mounted on a frame, supporting or included in, the motion generator.

Method of Using a Motion Generator

Figure 11:
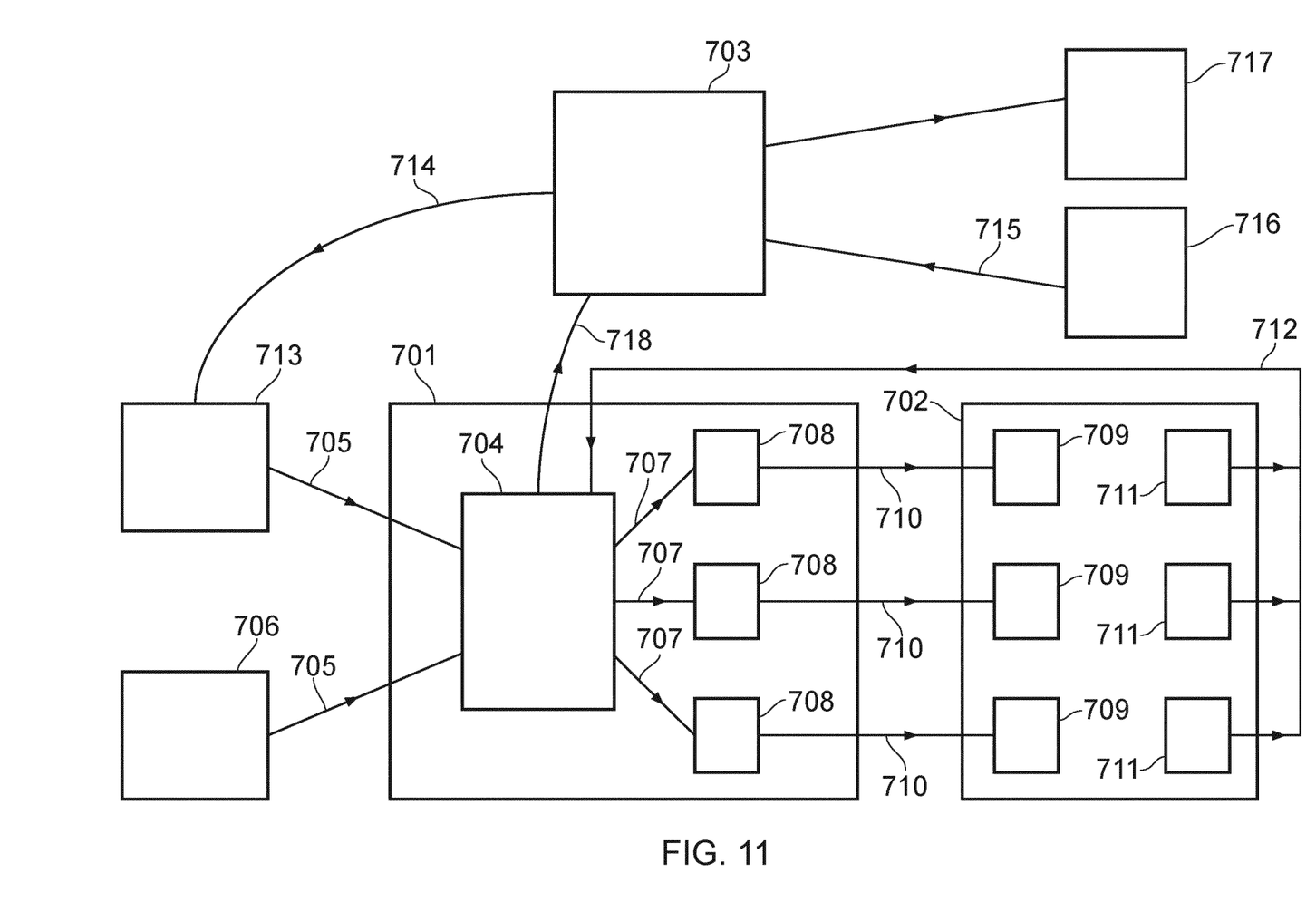
FIG. 11 is a schematic view of a control system for use in a motion system in accordance with the invention.

The motion generator 10 can be operated by actuating the actuation mechanisms of the generator, typically under the command of a control system, as shown for example in FIG. 11, so that the suspended end effector 14 is moved in six degrees of freedom by rocker-driven movements of the six tensioned members in the six actuation mechanisms.

Figure 2:
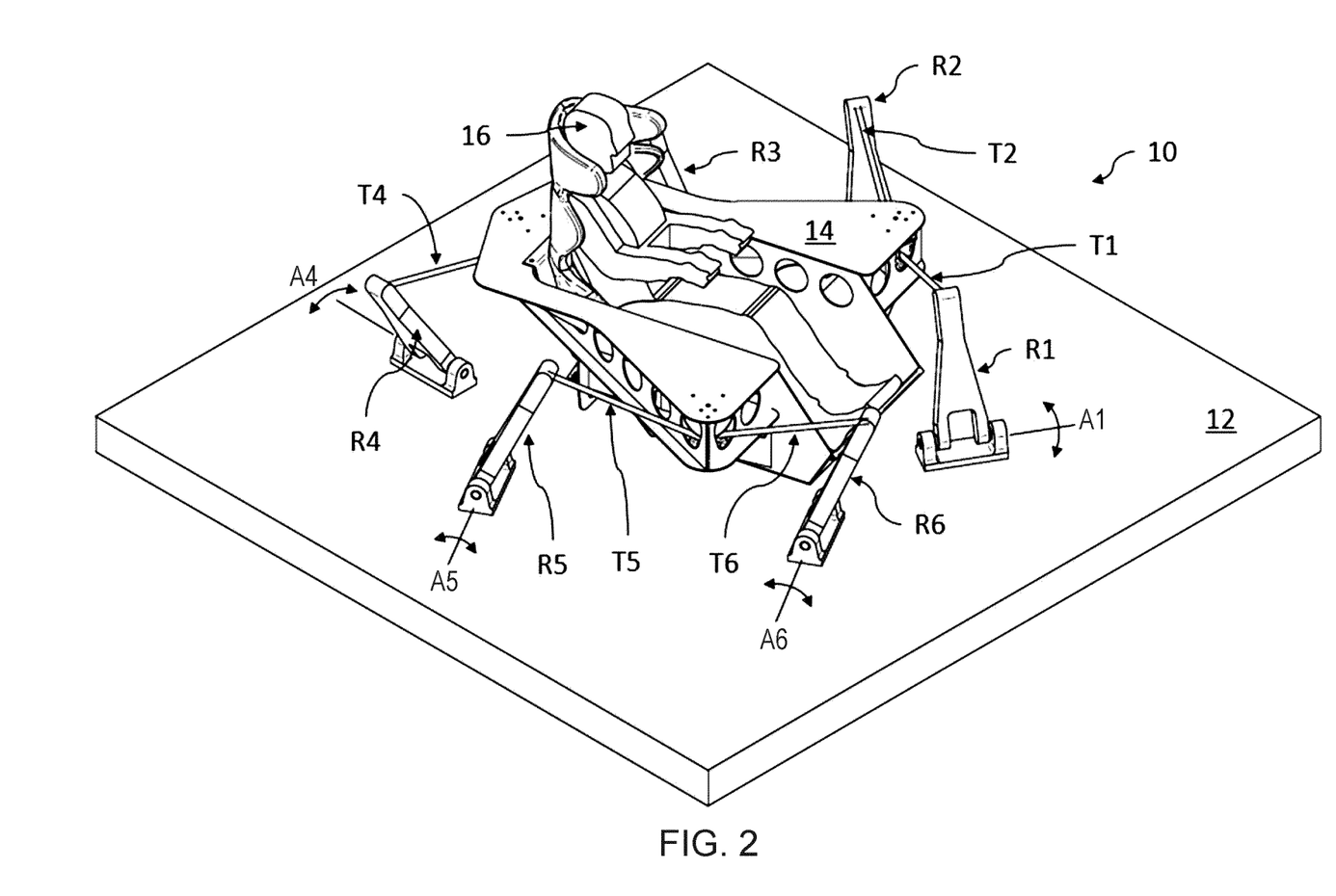
FIG. 2 is a perspective view from the front and one side of the motion generator of FIG. 1 in a yaw condition.

The motion generator 10 is shown in FIG. 2 with the end effector 14 in a yaw left condition. In this condition, the displacement states of the rockers are as follows:

| Rocker number | Rocker movement (viewed in direction of pivot axis from outboard viewpoint for each rocker) |
| --- | --- |
| R1 | Clockwise |
| R2 | Clockwise |
| R3 | Clockwise |
| R4 | Clockwise |
| R5 | Clockwise |
| R6 | Clockwise |

Figure 3:
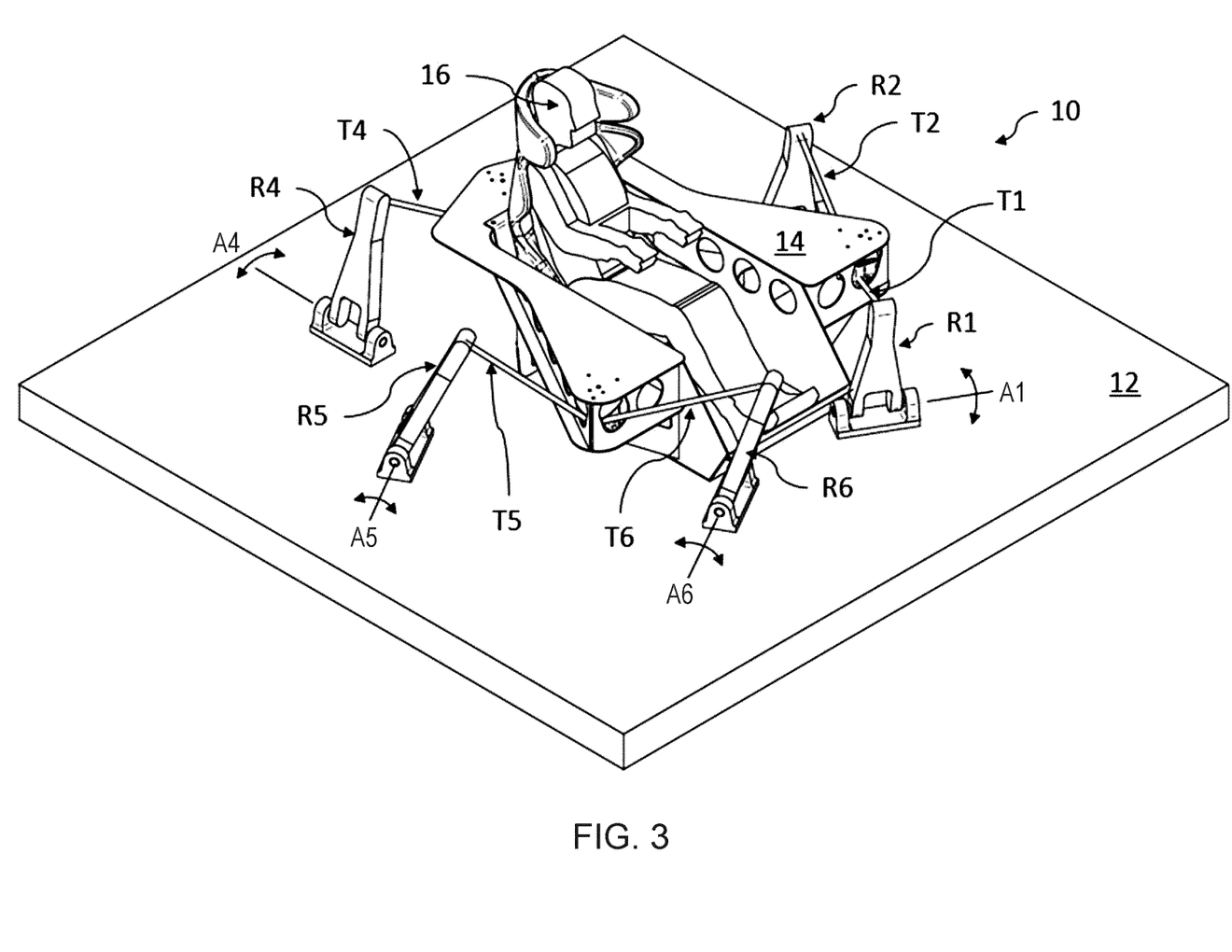
FIG. 3 is a perspective view from the front and one side of the motion generator of FIG. 1 in a surge forward condition.

The motion generator is shown in FIG. 3 with the end effector in a surge forward condition. In this condition the displacement states of the rockers are as follows:

| Rocker number | Rocker movement (viewed in direction of pivot axis from outboard viewpoint for each rocker) |
| --- | --- |
| R1 | Anticlockwise |
| R2 | Anticlockwise |
| R3 | Clockwise |
| R4 | Anticlockwise |
| R5 | Clockwise |
| R6 | Clockwise |

Whilst two conditions have been described above it will be appreciated that the suspended end effector 14 can be moved in six degrees of freedom by rocker-driven movements of the six tensioned members in the six actuation mechanisms into other conditions including sway right, heave up, heave down, surge back, and combinations of any such conditions.

Actuation Mechanism

Figure 4:
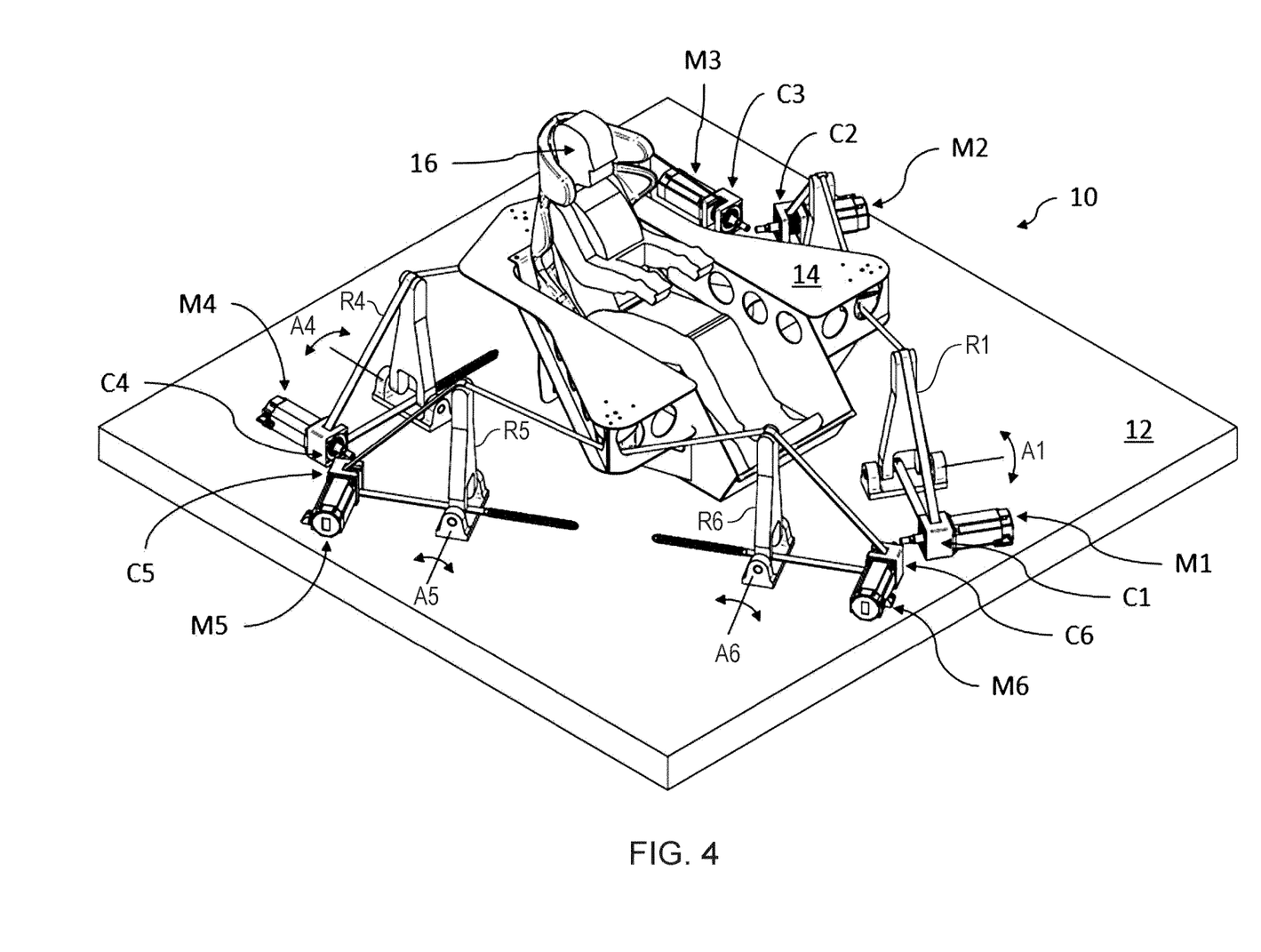
FIG. 4 is a perspective view from the front and one side of a motion generator in accordance with the invention generally as shown in FIG. 1 with one type of actuation mechanism in a neutral condition.
Figure 5:
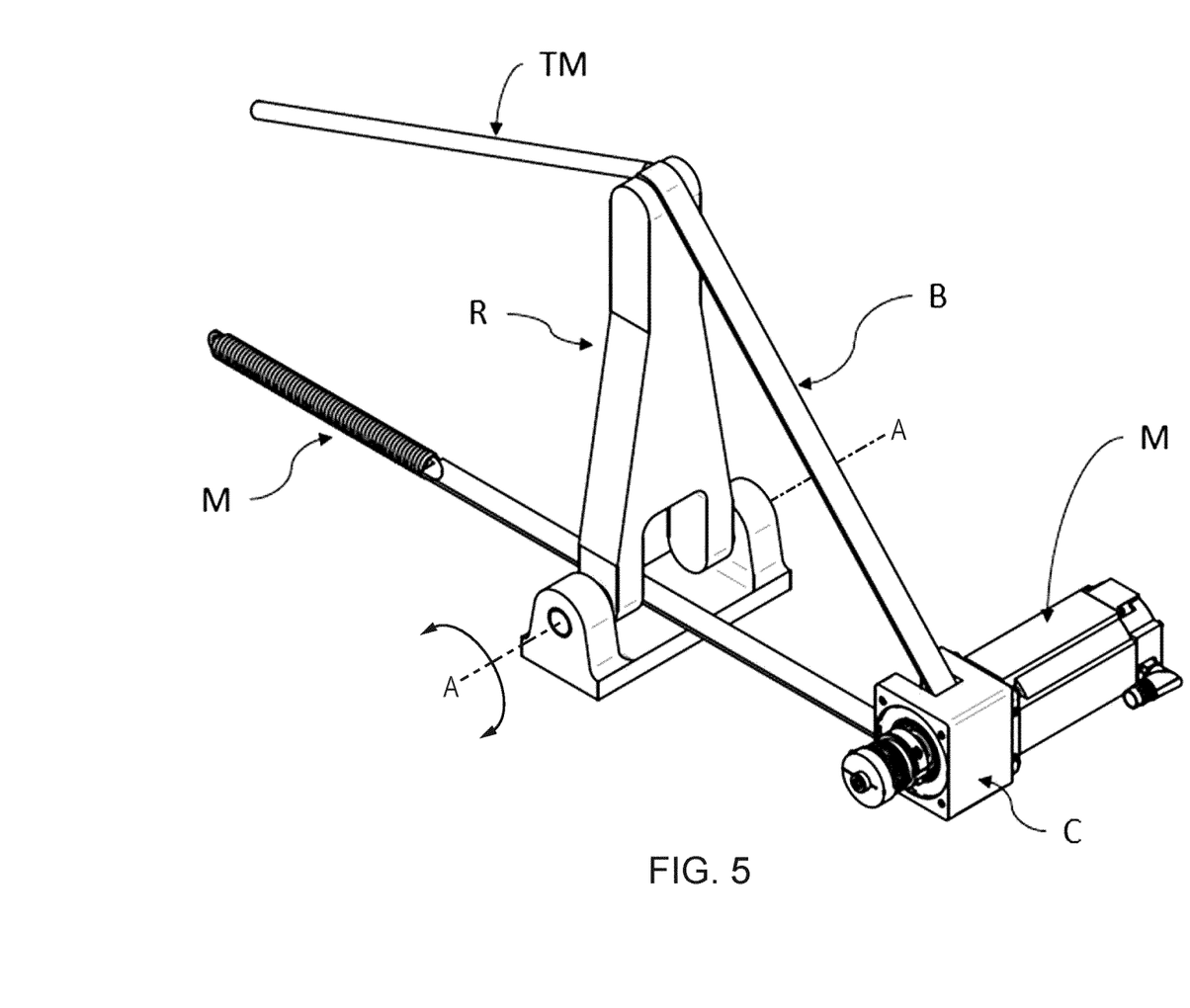
FIG. 5 is a detailed view of a portion of the motion generator actuation mechanism shown in FIG. 4.

FIGS. 4 and 5 illustrate one type of actuation mechanism for use in a motion generator of the invention. The motion generator 10 shown in FIG. 4 is as generally described in relation to FIGS. 1 to 3, including six actuation mechanisms, and the same elements are numbered the same. One actuation mechanism is shown in detail in FIG. 5. Elements of an actuation mechanism (e.g., X) are given the number of the actuation mechanism (i.e., X1, X2, X3, X4, X5, or X6) in the descriptions of the different types of actuation mechanisms below. The motion generator is provided with six such actuation mechanisms. In this form of actuation mechanism, and as shown in detail in FIG. 5, a rocker R is associated with an electric motor M which has a toothed capstan C (obscured). An elongate toothed belt B is connected at one of its ends to a spring S which keeps the belt B in tension. The other end of the toothed belt B is connected to an elongate tension member TM, which in turn suspends the end effector 14. Six such actuation mechanisms are provided in the motion generator. Operation of a motor M, under commands from a control system causes clockwise or anticlockwise displacement of the "free end" (i.e., the non-pivotally mounted end) of the associated rocker R1-6 through movement of the associated toothed belt B. This leads to movement of the tensioned member T which is connected to the rocker causing movement of the end effector for example into the yaw or surge forward configurations described above in relation to FIGS. 2 and 3 according to the displacement of the effector by the rockers R1-6.

Actuation Mechanism

Figure 6:
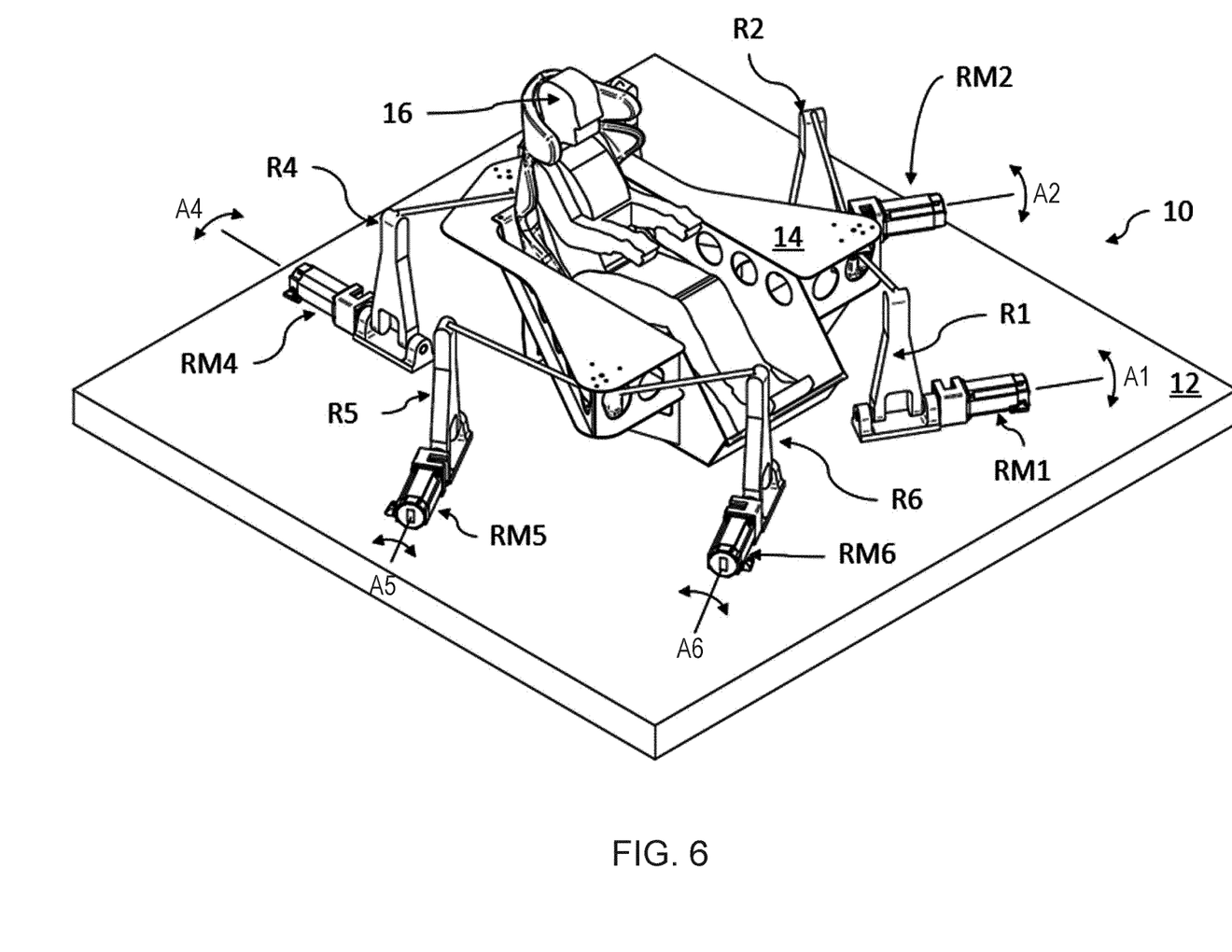
FIG. 6 is a perspective view from the front and one side of a motion generator in accordance with the invention generally as shown in FIG. 1 with another type of actuation mechanism in a neutral condition.

FIG. 6 illustrates another type of actuation mechanism for use in a motion generator of the invention. The motion generator 10 shown in FIG. 4 is again as generally described in relation to FIGS. 1 to 3 and the same elements are numbered the same. In this type of actuation mechanism, a pivotally mounted rocker R is associated with a motor RM which is directly connected to the rocker by a shaft (obscured). The free end of the rocker R is connected to a tensioned member, which in turn suspends the end effector 14. By means of this direct connection with a rocker, operation of a motor RM, under commands from a control system causes clockwise or anticlockwise displacement of the associated rocker R1-6 through movement of the associated shaft.

Actuation Mechanism

Figure 7:
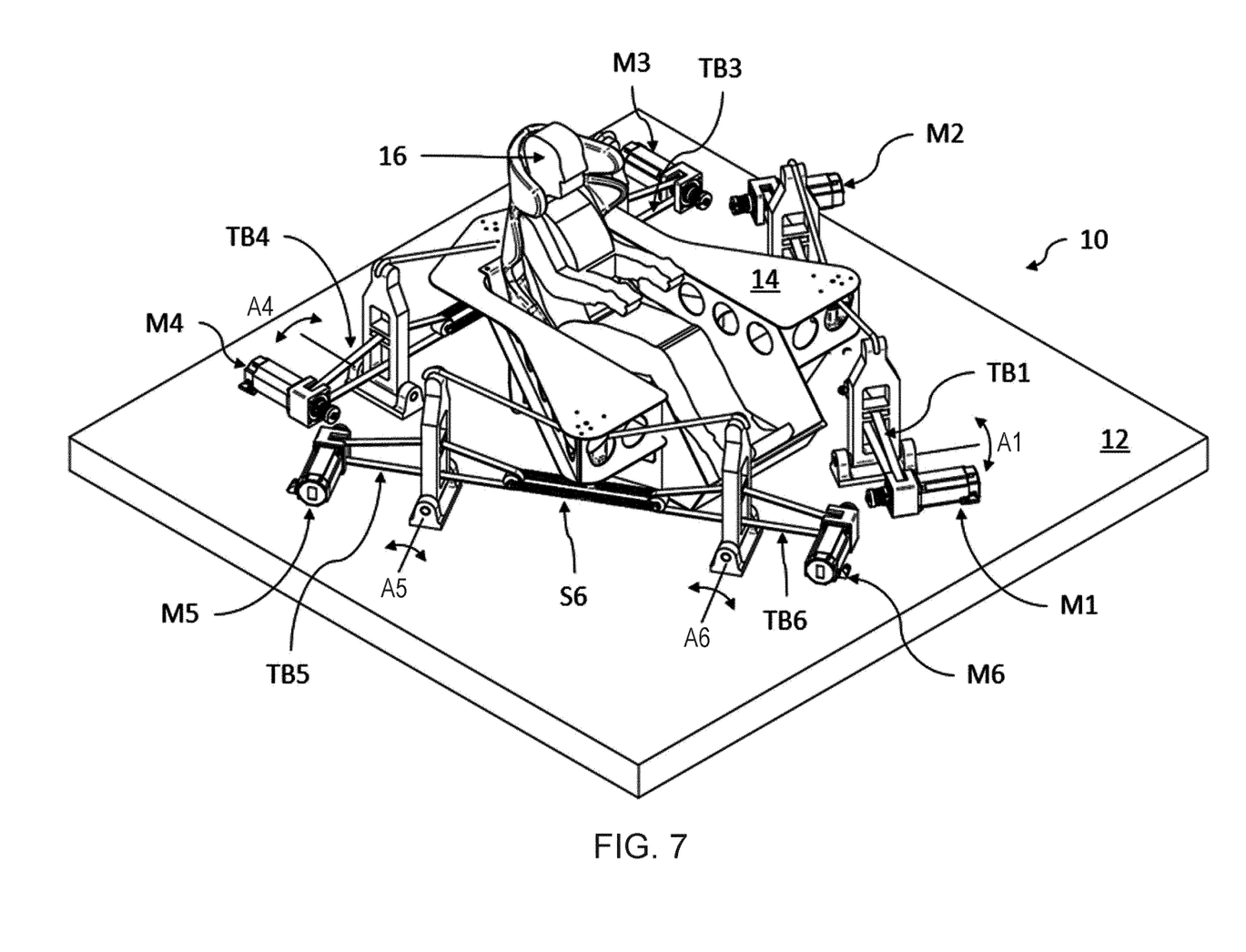
FIG. 7 is a perspective view from the front and one side of a motion generator in accordance with the invention generally as shown in FIG. 1 with a further type of actuation mechanism in a neutral condition.
Figure 8:
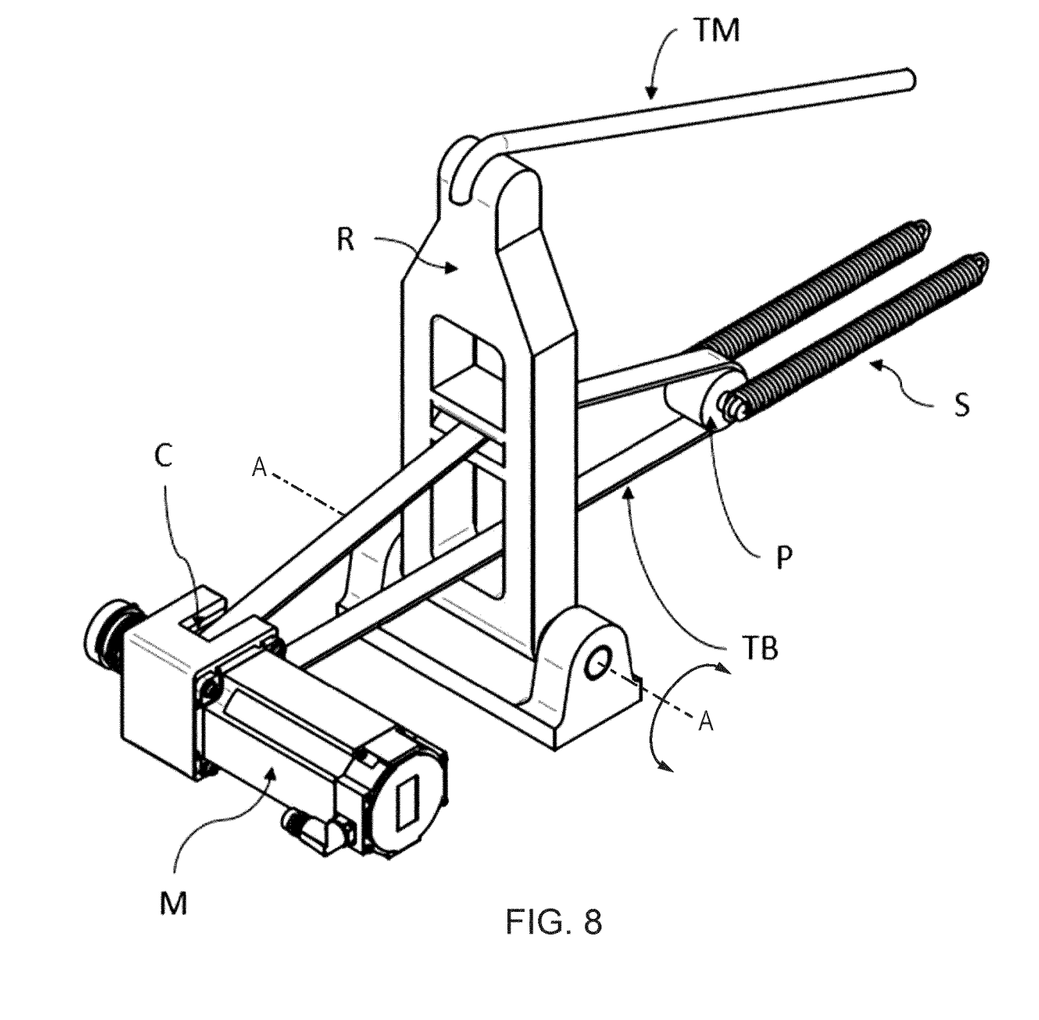
FIG. 8 is a detail view of the actuation mechanism shown in FIG. 7.

FIGS. 7 and 8 illustrate a further actuation mechanism for use in a motion generator of the invention. The motion generator 10 shown in FIG. 7 is again as generally described in relation to FIGS. 1 to 3 and the same elements are numbered the same. One actuation mechanism is shown in detail in FIG. 8. In this form of actuation mechanism, and as shown in detail in FIG. 8, a rocker R, which is pivotally mounted on axle A, is associated with a motor M which has a toothed capstan C on its shaft (obscured). An elongate toothed belt TB is connected at both ends to the rocker R, around the midpoint of the rocker and engages with the capstan C. It will be appreciated that the toothed belt TB may, alternatively, be continuous and fixed at one point to the rocker R. Other connection points are contemplated. Connection points towards the free end of the rocker may be preferred. An idler pulley P is biased by spring S to keep the belt B in tension. The free end of the rocker R is connected to an elongate tension member TM, which in turn suspends the end effector 14. Six such actuation mechanisms are provided in the motion generator. Operation of an electric motor M, under commands from a control system causes clockwise or anticlockwise displacement of the associated rocker R1-6 through movement of the associated toothed belt B. This leads to movement of the tensioned member T causing movement of the end effector 14 for example into the yaw or surge forward configurations described above in relation to FIGS. 2 and 3 according to the displacement of the effector by the rockers R1-6.

Several different types of actuation mechanisms have been described above by way of example. It is possible that a motion generator in accordance with the invention might include six of the same type of actuation mechanisms, or a mixture of actuation mechanisms for example of the types described above. A motion generation in accordance with the invention, might include more than six such actuation mechanisms, possibly for reasons of redundancy.

Motion System

A motion system in accordance with the invention, comprises a motion generator in accordance with the invention, and an associated motion generator control system. An example of a control system suitable for use in controlling operation of a motion generator in accordance with the invention is shown in FIG. 11. The control system 701 shown in FIG. 11 may receive inputs from a user. In relation to FIG. 11, the motion generator of the motion system is referred to as 702, but the control system 701 is applicable to the other motion generators, motion systems, and motion simulators, such as the motion generator 10 and motion simulators 20,30 described herein. The control system 701 comprises a motion controller 704 which executes a computer program, preferably in a deterministic or real time manner, and which takes motion demand inputs 705 from a demand generator such as a simulation environment 703 or a set point generator 706. The motion controller computes the positions, accelerations and/or forces 707 required to be produced at each actuator 709 in order to generate the demanded motion profile 705. The control system 701 also comprises servo drives 708 which provide precisely controlled electrical currents 710 to drive the actuators 709. In operation, the motion controller sends to each servo drive 708 a demanded position or force 707. The actuator 709 has a motion measurement device 711, such as an encoder, which provides motion feedback 712 to the motion controller, optionally via the servo drive. The motion controller compares the demanded motion profile 705 to the one measured 712 and updates the actuator demand 707 accordingly. FIG. 11 also shows the control system with a simulation environment 703, such as a driving simulation in which the physics of a simulated vehicle and its environment, such as a racetrack or city roads, are computed. In this embodiment the control system 701 receives motion demands from the simulation environment 703, which represent the motion of a virtual vehicle. The computer program determines the motion of the vehicle in a virtual world 714, then applies a motion cueing algorithm 713 (MCA, also known as washout filters) to transform the simulated vehicle motions into those that can be represented by the motion generator 701. These calculated motions are then provided to the control system as motion demands 705. The MCA 713 could be part of the simulation environment 703 or the control system 701 or separate to both. The simulation environment 703 may receive inputs signals 715 from control devices 716 such as steering, throttle or brake inputs, which an operator, i.e., a human user such as a driver, passenger or pilot uses to control the virtual vehicle in the simulation environment. The operator would likely be a passenger on the motion generator 702. These inputs 715 may be passed back to the simulation environment via the control system or directly. The simulation environment is also likely to produce an output on a visual display 717 for the driver, passenger, or other user or operator. The simulation environment may also require additional data 718 from the control system, such as relating to the position of the motion generator, or control device input signals.

Motion Simulator

Figure 9:
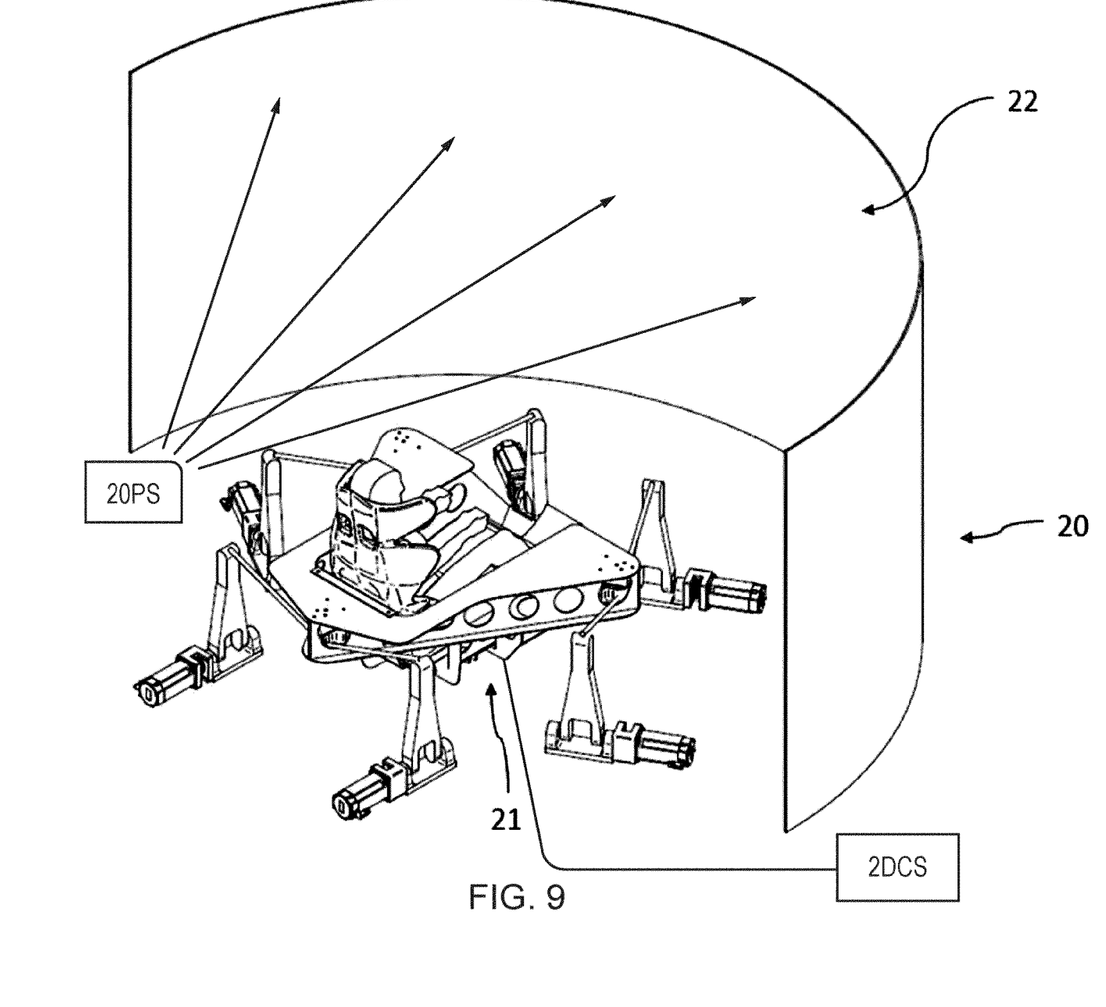
FIG. 9 is a perspective schematic view of a motion simulator in accordance with the invention.
Figure 10:
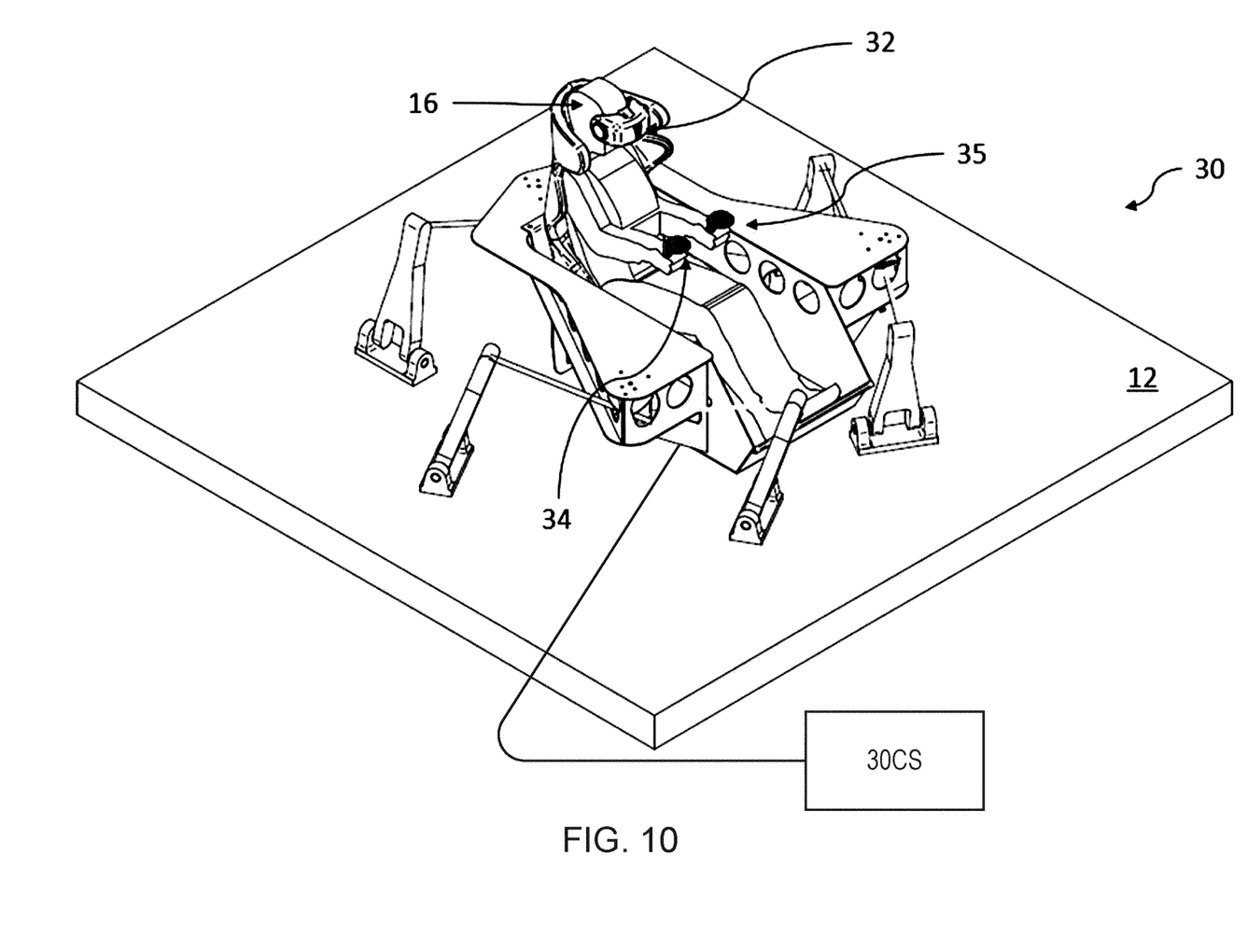
FIG. 10 is a perspective view of another motion simulator in accordance with the invention.

Motion simulators 20 and 30 in accordance with the invention are shown in FIGS. 9 and 10. The motion simulator 20 comprises a motion system 21 (including a control system 20CS) in accordance with the invention (for example as described above) and at least one environment simulation means.

In the FIG. 9 motion simulator 20, the environment simulation means includes a projection system 20PS and screen 22. A separate environment simulation means in the form of an audio system may also be provided.

In the FIG. 10 motion simulator, 30, the environment simulation means is in the form of a virtual reality headset 32 worn by user 16. FIG. 10 also shows user input devices, here joysticks 34,35, which may be used to provide inputs to an associated motion generator control system 30CS.

Method of Production of a Motion Generator

A method of production of a motion generator according to the invention may compromise, providing an end effector and at least six actuation mechanisms, in which each actuation mechanism comprises an elongate tensioned member connected at one of its ends to the end effector, whereby the end effector is suspended above the surface by the tensioned members, and at the other of its ends to an associated rocker of the same actuation mechanism, whereby the rocker is mounted to be pivotable about an axis which is fixed relative to the surface, and in which, when a rocker is actuated the associated tensioned member and the end effector are moved, and assembling the aforesaid elements to produce a motion generator. The method may further comprise connecting a control system to the motion generator, to produce a motion simulator.

The invention claimed is:

1. A motion generator comprising an end effector which moves relative to a surface, the end effector being moved by at least six actuation mechanisms, in which each actuation mechanism comprises an elongate tensioned member connected at one of its ends to the end effector, whereby the end effector is suspended above the surface by the tensioned members, and at the other of its ends to an associated rocker of the same actuation mechanism, whereby the rocker is mounted to be pivotable about an axis which is fixed relative to the surface, and in which, when a rocker is actuated, the associated tensioned member and the end effector are moved, wherein either (i) at least one of the at least six actuation mechanisms comprises a tensioned belt connected to the rocker at a point along its length, or (ii) at least one or the at least six actuation mechanisms comprises an elongate tensioned belt that is connected at both of its ends to the rocker and actuated by a capstan, or pulley, or actuated by a motor.

2. The motion generator according to claim 1, in which each tensioned member is connected at a point along the length of an associated rocker in the same actuation mechanism.

3. The motion generator according to claim 2, in which the point is towards the non-pivotally mounted end of the rocker.

4. The motion generator according to claim 3, in which each rocker is pivotally mounted on a revolute joint or bearing.

5. The motion generator according to claim 1, in which at least one actuation mechanism comprises a motor drivably connected to the rocker.

6. The motion generator according to claim 5, in which the motor is an electric motor, torque motor or geared motor.

7. The motion generator according to claim 6, in which all the actuation mechanisms comprise an electric motor, torque motor or geared motor drivably connected to the rocker.

8. The motion generator according to claim 7, in which a motor of one actuation mechanism is connected to the rocker of the same actuation mechanism by a shaft drivably connected to the rocker at its pivot point, whereby, in use, the rocker is pivoted by rotation of the shaft.

9. The motion generator according to claim 8, in which the shaft is concentric with the axis about which the rocker pivots.

10. The motion generator according to claim 1, in which all the actuation mechanisms comprise a tensioned belt connected to the rocker at a point along the length of the rocker.

11. The motion generator according to claim 10, in which the point is towards a non-pivotally mounted end of the rocker.

12. The motion generator according to claim 11, in which the tensioned belt is connected to the rocker at the end of the rocker.

13. The motion generator according to claim 1, in which the tensioned belt is actuated by a capstan or pulley actuated by an associated motor or other drive device and kept in tension by a spring or other elastic member attached to its other end.

14. The motion generator according to claim 1, in which the elongate tensioned belt that is connected at both of its ends to the rocker and actuated by a capstan, or pulley, or actuated by a motor is kept in tension by an idler pulley connected to a spring or other elastic member.

15. The motion generator according to claim 14, in which all the actuation mechanisms comprise such an elongate tensioned belt.

16. A motion system comprising:
a motion generator according to claim 1, and
a motion generator control system.

17. A motion simulator comprising:
a motion generator according to claim 1, and
at least one environment simulation means.

18. A method of operating a motion generator, the method comprising:
providing a motion generator comprising an end effector which moves relative to a surface, the end effector being moved by at least six actuation mechanisms, in which each actuation mechanism comprises an elongate tensioned member connected at one of its ends to the end effector, whereby the end effector is suspended above the surface by the tensioned members, and at the other of its ends to an associated rocker of the same actuation mechanism, whereby the rocker is mounted to be pivotable about an axis which is fixed relative to the surface, wherein either (i) at least one of the at least six actuation mechanisms comprises a tensioned belt connected to the rocker at a point along its length, or (ii) at least one or the at least six actuation mechanisms comprises an elongate tensioned belt that is connected at both of its ends to the rocker and actuated by a capstan, or pulley, or actuated by a motor; and operating some or several of the at least six actuation mechanisms to move the end effector in up to six degrees of freedom.

19. The method according to claim 18, in which the operation is by means of a motion generator control system connected to a motion generator or in a motion system.

20. The method according to claim 19, in which the control system is user operated.

21. A method of production of a motion generator, the method comprising:

providing components including an end effector and at least six actuation mechanisms, in which each actuation mechanism comprises an elongate tensioned member and an associated rocker, wherein either: (i) at least one actuation mechanism comprises a tensioned belt connected to the rocker at a point along its length; or (ii) at least one actuation mechanism comprises an elongate tensioned belt that is connected at both of its ends to the rocker and actuated by a capstan, or pulley, or actuated by a motor, and assembling the aforesaid components to produce a motion generator, in which the elongate tensioned member is connected at one of its ends to the end effector, whereby the end effector is suspended above the surface by the tensioned members, and connected at the other of its ends to the associated rocker of the same actuation mechanism, whereby the rocker is mounted to be pivotable about the axis which is fixed relative to the surface, and in which, when a rocker is actuated the associated tensioned member and the suspended end effector are moved.

22. The method of claim 21, further comprising connecting a control system to the motion generator.

* * * * *